Nov. 30, 1954  W. MÖBIUS  2,695,541
DRIVING GEARS FOR LATHES, AND PARTICULARLY
FOR TURRET LATHES
Filed May 1, 1951
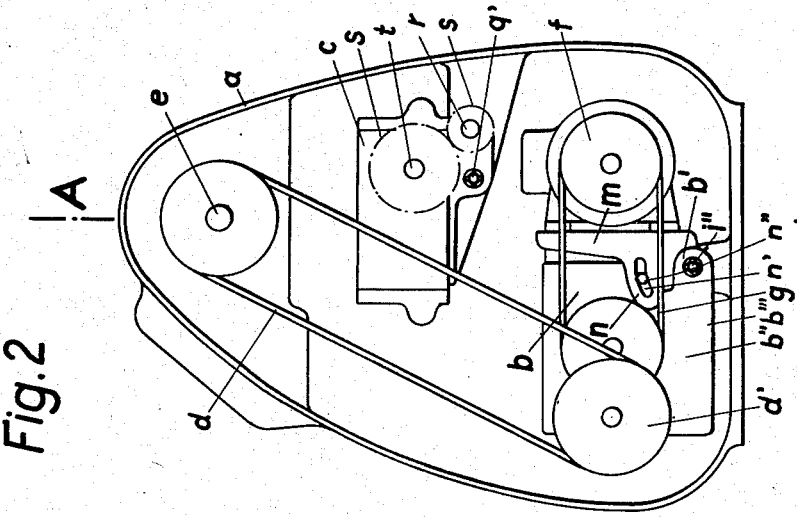
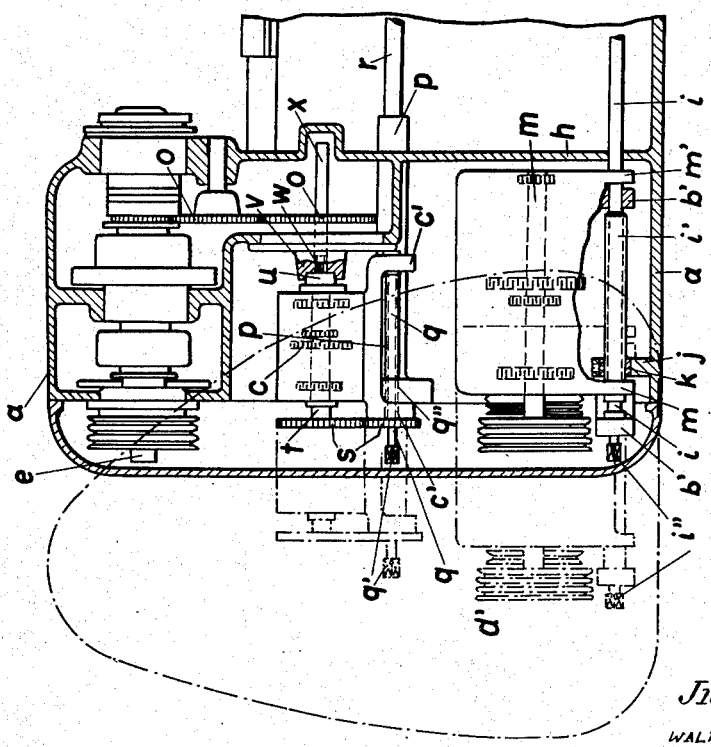
Inventor:
WALTER MÖBIUS
by [signature]
Attorney

United States Patent Office 2,695,541
Patented Nov. 30, 1954

2,695,541

DRIVING GEARS FOR LATHES, AND PARTICULARLY FOR TURRET LATHES

Walter Möbius, Bielefeld, Germany, assignor to Werkzeugmaschinenfabrik Gildemeister & Comp., Akt.-Ges., Bielefeld, Germany, a corporation of Germany Application May 1, 1951, Serial No. 227,361

Claims priority, application Germany May 2, 1950

3 Claims. (Cl. 82—2)

The invention relates to the driving gears in machine tools and particularly in lathes or turret lathes. Heretofore it was customary to fix the casing of the driving gears in the frame of the machine tools, or to fix the bearings of the turning devices of the drive within the frame. In this latter case the frame itself serves simultaneously as a housing for the driving gear. Sometimes the driving gears were adjustably attached within the frame to change the tension of the driving belt or to interchange the engaging gears. Different means have been used for these purposes. For example, the driving gear was supported by a swingle, or the casing of the gear was fixed upon an adjustable plate, which could be adjusted by loosening the fixing screws. However, in this manner only minor movements of the gears could be effected for the purpose of adjustment.

In contrast to these known arrangements, the invention provides for a means by which the driving gears can be completely removed from the frame of the turret lathe. The term "driving gears" is to include all the parts which are necessary for the turning, regulating and switching of the operating parts of the turret lathe. In this way all parts of the driving gear form a unit which is removed from the frame as a whole and in the same combination in which the unit was used inside the frame during the operation of the lathe.

For that purpose the driving gear unit is supported by a guide in the frame. The frame itself is sliding and the casing of the gear is tilting on the guide under the influence of the weight of the gear in order to utilize its turning movement for the tension of the driving belt.

One important feature of the invention is the accessibility of all parts of the driving unit after its removal from the frame. Another advantage of the invention is that the unit, after being removed from the frame, can easily be tested, due to the fact that the unit remains completely assembled, including the driving motor with the switches. Damaged parts can be eliminated, and after its re-assembly the unit can be tested again and returned into the frame to the proper working position. No screwing onto the frame is required because the mechanical devices for putting the unit back into the frame automatically restore the connection with the driving parts.

A further advantage of the invention is the highly finished form and smooth appearance of the frame. The driving gears can be arranged in a superimposed position at the driving side of the lathe, and the openings for the insertion of the driving gears can be closed by doors which can be cast in conformity with the shape of the frame.

The performance of repairs is made in a minimum of time, because damaged parts can be located very easily by examination of the unit outside of the lathe. Complete units of the same type can be used for different types of lathes, so that great economy in the manufacture and storage may be obtained. An important advantage results if the invention is used for the driving gears of high-speed lathes. The multiple-speed driving gears of these lathes are situated in the base of the frame and their movement is transferred to the headstock by belts in order to produce a working of the lathe without vibrations, an arrangement which is a postulate of a well finished product. Therefore the invention has the advantage for high-speed lathes that the movable driving gear can be used for the tension of the belt, and tension rollers are no longer required.

The drawing shows an example of the invention:
Fig. 1 is a section through the driving part of a turret lathe to A—A of Fig. 2;
Fig. 2 is a view to the left side of the turret lathe.

Two gears $b$ and $c$ are mounted in the frame $a$. The gear $b$ drives the operating spindle and regulates its revolutions by means of a cone belt $d$. The motor $f$ drives the gear $b$ by the belt $g$.

The casing $b''$ of the driving gear $b$ has two eyes $b'$ which are slideable and turnable on a round bar $i$ which itself is sliding in the wall $h$ of the frame $a$. The round bar is connected with a threaded rod $i'$ on its front part, and the nut $k$ for the thread is fixed in the bearing $j$. The front end of the round bar $i$ has a square $i''$ for fixing a socket wrench, to remove the round bar from the lathe. Therewith the driving gear $b$ is removed, also, completely from the frame, and it is accessible from all sides.

By forming the eyes $b'$ on one side of the casing the center of gravity of the driving gear is laid onto the side of the driving pulley $d'$, so that the belt $d$ is constantly under the tension of the weight of the swingable casing.

The socle $m$ of the motor $f$ has two eyes $m'$ supported by the round bar $i$ to remove the motor together with the driving gear. The socle $m$ has on its sides guide plates $n$ with slits $n'$ and clamping screws $n''$ which are used for shifting the motor and for stressing the belt $g$. The supports $n$ may have rolls which are adjustable in their height. The base plate $b'''$ of the casing $b''$ is formed so that it serves as a space for the accumulating oil.

The feed gear $c$ in the upper part of the frame serves for the change of feed of the shaft $r$ and is connected with the operating spindle $e$ by the gears $o$. The casing of the feed gear $c$ has eyes $c'$ supported by the slideable tube $p$ which is located parallel to a spindle $q$, whose nut $q''$ is fixed in the frame and which has on its end a square $q'$ turnable by a socket wrench.

The tube $p$ is used as a support for the feed shaft $r$ which is connected by changeable gears $s$ with the driving shaft $t$ of the feed gear $c$. Their casing has a centering ring $u$ which engages into a hub $v$ on the frame, and the pivot $w$ of the gear $c$ protrudes from the centering ring $u$. The pivot $w$ is formed as a clutch member for agitating the shaft $x$. The clutch between pivot $w$ and shaft $x$ will be lifted by removing the feed gear.

Having thus described the invention, what I claim as new and desire to be secured by Letters Patent, is as follows.

1. A power driven lathe and particularly a turret lathe comprising a machine bed, a headstock mounted upon one end of said bed, a spindle journalled inside of said headstock, a motor located in the lower part of said machine bed, driving means operatively connecting said motor with said spindle, said machine bed and said headstock forming a housing for said driving means, a door adjusted to the side of said machine bed and being adjacently located to said driving means, gear units located inside of said machine bed, casings for each of said gear units, at least one guide bar for each of said casings, said guide bar being supported inside of said machine bed and slidably arranged in the direction towards said door, means connecting said guide bar and said casing and adapted to pull said casing and said guide bar from the inside of said machine bed whereby said casing is made accessible from all sides.

2. In a power driven lathe according to claim 1, a guide bar consisting of a shaft partly provided with a square thread, a square on the free end of said shaft, supporting eyes integrally connected with said casing and embracing said shaft, a socle carrying said motor and rotatably mounted on said shaft and means to adjust said socle to said casing for the purpose to pull simultaneously said casing, said motor and said bar from the inside of said machine bed.

3. In a power driven lathe according to claim 1, a feed shaft and feed gear unit, a casing enclosing said feed gear unit, a centering ring fixed to said casing, a drive shaft for said feed gear unit journalled inside of said machine bed, a hub provided inside of said machine bed, a recess in said hub centered to said drive shaft and being located opposite to said centering ring and automatically operative clutching means attached to said driving shaft and said feed gear unit.

References Cited in the file of this patent

UNITED STATES PATENTS

| Number | Name | Date |
|---|---|---|
| 357,567 | Barnes | Feb. 15, 1887 |
| 1,501,346 | Ingham et al. | July 15, 1924 |
| 1,971,956 | Hoelscher | Aug. 28, 1934 |
| 2,062,128 | Hamerstadt | Nov. 24, 1936 |
| 2,287,046 | Logan | June 23, 1942 |
| 2,370,048 | Koch | Feb. 20, 1945 |